United States Patent
Kozhevnikov et al.

(10) Patent No.: US 7,689,073 B2
(45) Date of Patent: Mar. 30, 2010

(54) 1×N WAVELENGTH SELECTIVE SWITCH

(75) Inventors: Michael Kozhevnikov, Newark, NJ (US); David Thomas Neilson, Old Bridge, NJ (US); Roland Ryf, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 892 days.

(21) Appl. No.: 10/780,248

(22) Filed: Feb. 17, 2004

(65) Prior Publication Data

US 2005/0180689 A1    Aug. 18, 2005

(51) Int. Cl.
G02B 6/00 (2006.01)
G02B 6/26 (2006.01)
G02B 6/28 (2006.01)
G02B 6/32 (2006.01)
G02B 6/42 (2006.01)

(52) U.S. Cl. ............... 385/24; 385/15; 385/16; 385/31; 385/33; 385/47; 385/137

(58) Field of Classification Search ............ 385/24, 385/14, 15, 31, 33, 47, 137; 398/79, 82, 398/86
See application file for complete search history.

(56) References Cited

U.S. PATENT DOCUMENTS

| | | | |
|---|---|---|---|
| 6,269,202 B1 * | 7/2001 | Lee et al. | 385/24 |
| 6,606,427 B1 * | 8/2003 | Graves et al. | 385/17 |
| 6,657,770 B2 | 12/2003 | Marom et al. | 359/290 |
| 6,721,099 B2 * | 4/2004 | Hatano et al. | 359/578 |
| 2003/0021525 A1 * | 1/2003 | Turpin et al. | 385/24 |
| 2003/0059195 A1 * | 3/2003 | Brennan et al. | 385/146 |
| 2003/0128917 A1 * | 7/2003 | Turpin et al. | 385/24 |
| 2003/0223679 A1 * | 12/2003 | Mala et al. | 385/18 |
| 2005/0213877 A1 * | 9/2005 | Wu et al. | 385/18 |

* cited by examiner

*Primary Examiner*—Frank G Font
*Assistant Examiner*—Jerry M Blevins
(74) *Attorney, Agent, or Firm*—E. J. Rosenthal (57) ABSTRACT

A device employing at least one wavelength sieve/combiner that operates on discrete wavelength units and is optically interposed between an array of fibers and an array of micro mirrors which may be configured to act as in a multiplexing mode, a demultiplexing mode, a broadcast mode, and combinations of such modes. Each wavelength sieve/combiner can split a wavelength division multiplexed (WDM) beam into various discrete wavelength unit beams, combine various discrete wavelength unit beams into a WDM beam, or cause multiple copies of part or all of the wavelengths to be supplied as outputs. Typically, each fiber is associated with one wavelength sieve/combiner. Preferably, the beams between a wavelength sieve/combiner and the micro mirror array should be converging to the plane of the micro mirror array.

35 Claims, 5 Drawing Sheets

1×N WAVELENGTH SELECTIVE SWITCH

TECHNICAL FIELD

This invention relates to the art of optical switching, and more particularly, to the switching of various wavelengths of a wavelength division multiplexed optical signal from at least one input port to one or more output ports, and vice-versa.

BACKGROUND OF THE INVENTION

The transmission capacity of fiber-optic communication systems has been increased significantly by the use of wavelength division multiplexing (WDM) techniques. In a WDM communication system, multiple channels—where each channel is differentiated by using a unique wavelength of light—carry modulated optical signals in a single optical fiber between a transmitter and a receiver. The transmitter uses an optical multiplexer to combine multiple channels into the fiber for transmission, and the receiver uses an optical demultiplexer to separate the optical channels for detection. A typical optical demultiplexer (demux) contains a single input port and multiple output ports, where each optical channel from the input port is mapped to a unique output port in sequential order. One such optical demultiplexer is shown in U.S. patent application Ser. No. 09/944,800, which is incorporated by reference as if fully set forth herein. Optical multiplexers are simply demultiplexers operated in the reverse direction, where a specific wavelength has to be supplied to the correct input port to emerge at the output port as part of a multiplexed signal.

U.S. patent application Ser. No. 09/944,800 discloses a programmable optical multiplexer/demultiplexer having multiple ports that can establish an independent reconfigurable connection between any two of the device's ports for each optical wavelength that is supplied to the device as part of a wavelength division multiplexed signal. In one arrangement disclosed therein, a programmable demultiplexer receives an input signal containing components at N different wavelengths at a port of the arrangement that acts as an input port, and distributes the input signal components among K ports that act as output ports. The input signal is collimated by a particular microlens in a microlens array, the particular lens being aligned to the input port. The microlens array contains K additional microlenses, each of which is aligned with a respective one of the K output ports. The resultant collimated beam originating from the input port is then made incident on a diffraction grating, which angularly disperses the composite optical signal according to wavelength, thereby forming N separate beams, each being at a different wavelength and having a distinct propagation angle. Each of the N separate beams propagates to a single lens that is arranged to collect all the beams and provide, for each wavelength, a converging beam focused onto a particular micro mirror in an array containing N micro mirrors. Each mirror in the array is individually controlled to reflect the incident beam, which is at least one of the various wavelengths, in a desired direction, such that it will (a) re-enter the lens, (b) be collimated by the lens and redirected to a different location on the diffraction grating, and (c) be eventually coupled from the diffraction grating through a particular microlens in the microlens array to a desired output port, the particular microlens being aligned with the desired output port.

Generally, the number of output ports K and optical wavelength components N are independent. The demultiplexer can be designed to operate in the regime where K=N, so that each wavelength component can be assigned to any output port. The arrangment can also be operated in a mode where K<N, in which case more than one wavelength is applied to an output port, or in a mode where K>N, in which case one or more output ports are not used. In any event, the arrangement enables assignment of any wavelength to any output port Such an arrangement may also be operated in the "reverse" direction, in order to act as a programmable multiplexer, rather than as a demultiplexer. In the multiplexer arrangement, K input signals, each containing one or more different wavelengths, are received from a plurality of K optical input ports and must be combined and made available at a single output port. The K input signals cumulatively contain a total of N different wavelengths, or, stated differently, any particular wavelength component can exist at only one of the K input ports. If this criterion is not met, contention will occur. Each input signal is collimated by a respective microlens in a microlens array that contains K+1 microlenses. One microlens is aligned with the output port, while the remaining microlenses are aligned each to a corresponding input port. The resultant collimated beam originating from each input port is then made incident on a diffraction grating, which diffracts the optical signal as a function of its wavelength. The diffraction grating is arranged such that all of the separate beams, which have different wavelengths and therefore distinct propagation angles, propagate to a single microlens that collects all of the beams and provides, for each wavelength, a converging beam focused onto a particular micro mirror in a micro mirror array. Each micro mirror in the array is individually controlled to reflect the incident beam, representing a corresponding wavelength in the desired direction, such that it will (a) re-enter the microlens, (b) be collimated by the microlens and redirected to a single location on the diffraction grating, and (c) be eventually coupled from the diffraction grating to the output port through the particular microlens in the microlens array that is aligned with the output port.

Again, in general, the number of input ports K and optical wavelength components N are independent. The multiplexer can be designed to operate where K=N, so that each wavelength component can originate at any input port. The arrangment can also be operated in a mode where K<N, in which case more than one wavelength is applied to an input port, or in a mode where K>N, in which case one or more input ports are not used. In any event, the arrangement enables multiplexing of all input wavelengths originating at the K input ports to the output port.

Disadvantageously, such an arrangement is too expensive for a small number of wavelengths, because it requires the same costly precise alignment of all components independent of the number of wavelengths employed, so the per-wavelength cost is high for a small number of wavelengths. Such an arrangement is also relatively inflexible in regards to its wavelength splitting abilities. More specifically, the bandwidth is distributed homogenously over a plurality of micro mirrors. The mirror dimensions must be chosen to correspond to the desired wavelength bandwidth. This makes it desirable to have the smallest possible spacing between the mirrors. Furthermore, if there is a gap between the mirrors, there will be a gap between the wavelengths.

SUMMARY OF THE INVENTION

We have recognized that the disadvantages of prior art 1×N wavelength selective switches may be overcome, in accordance with the principles of the invention, by employing at least one wavelength sieve/combiner that operates on discrete wavelength units and is optically interposed between an array of optical sources and sinks, such as optical fibers, and an array of micro mirrors.

Each wavelength sieve/combiner can split a wavelength division multiplexed (WDM) beam into various discrete wavelength unit beams each of which contains prescribed wavelength channels, or it can cause multiple copies of part or all of the wavelengths to be supplied as outputs. Each wavelength sieve/combiner may also function in the opposite direction to combine such various beams into one wavelength division multiplexed beam. Typically, each fiber is associated with one wavelength sieve/combiner.

Each wavelength sieve/combiner may be implemented by placing at least one thin film filter along at least a first side of a substrate, such as a glass plate. Typically, more than one thin film filter is employed, e.g., one for each wavelength channel to be split out of, or combined into, a WDM beam. The second, opposite, side of the glass plate may include reflective portions to guide light not passed by any previously encountered thin film filters onto the next thin film filter. In other embodiments of the invention, the second side of the glass may also contain additional thin film filters to allow prescribed wavelength channels to exit from that side of the glass. In such embodiments of the invention an additional focusing system and array of micro mirrors located on that second side of the glass may be employed to focus and reflect beams exiting from the second side of the glass. The wavelength sieve/combiners may be arranged adjacent to one another, e.g., at the same spacing as fibers. Preferably, the wavelength sieve/combiners are formed in an integrated fashion on a single substrate. For example, the parallel strips of the thin film filters may be placed on the substrate in the same direction as the fibers are adjacent to each other.

A wavelength sieve/combiner may also be implemented in a free-space version by suspending appropriately the necessary filter and reflective elements. Also, substrates other than glass may be employed, so long as they do not cause undue attenuation of the wavelengths of interest.

Preferably, the beams between a wavelength sieve/combiner and the micro mirror array should be converging to the plane of the micro mirror array. This may be achieved by employing a focusing system that focuses the output beams from the wavelength sieve/combiner onto the array of micro mirrors. Such a focusing system may be, for example, a cylindrical lens or a stack of segmented spherical lenses assembled together with one segment for each respective wavelength sieve/combiner. Alternatively, the beams from the fibers may be made converging as they emerge from the fibers. In such an embodiment of the invention, a prism may be interposed between a wavelength sieve/combiner and the micro mirror array to appropriately line-up the beams.

Primarily, the micro mirrors are arranged to tilt about a first axis, which is the axis that the mirrors would have in common when stacked one on top of the other. It is also advantageous, for purposes of hitless switching and to alleviate alignment requirements, for the micro mirrors to be able to tilt around a second axis, orthogonal to the first axis. Tilting about the second axis is used for hitless switching because such tilting essentially takes the micro mirror "offline" by reflecting the beam out of the surface of a sieve/combiner. The micro mirror is then tilted around its first axis to the desired new position that accommodates a change in output requirements, and then tilted around the second axis back "online", so the beam now hits the new appropriate thin film filter on the sieve/combiner. Advantageously, while the micro mirror is tilted offline, its beam will not be accidentally directed to an incorrect output fiber, which may otherwise occur should the tilt of the mirror about the first axis be changed while the micro mirror is online. Alignment requirements of the micro mirrors are alleviated because they may be tilted about the second axis once the system is operational to compensate for any slight misalignment.

Advantageously, in contrast to the prior art system, due to the discrete nature of the wavelength units processed by a wavelength sieve/combiner, the beam width on the micro mirror is independent of the bandwidth of a data signal being carried by the beam.

If the thin film filters employed are not wavelength selective, but instead simply pass only a portion of all of the wavelengths, e.g., 10%, multiple copies of the input signal can be created. Each copy may then be routed to an output fiber, thus providing a broadcast function. Similarly, only some of the wavelengths may have only a portion passed, thereby creating copies of those wavelengths.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGs. refer to the same components.

Figure 1:
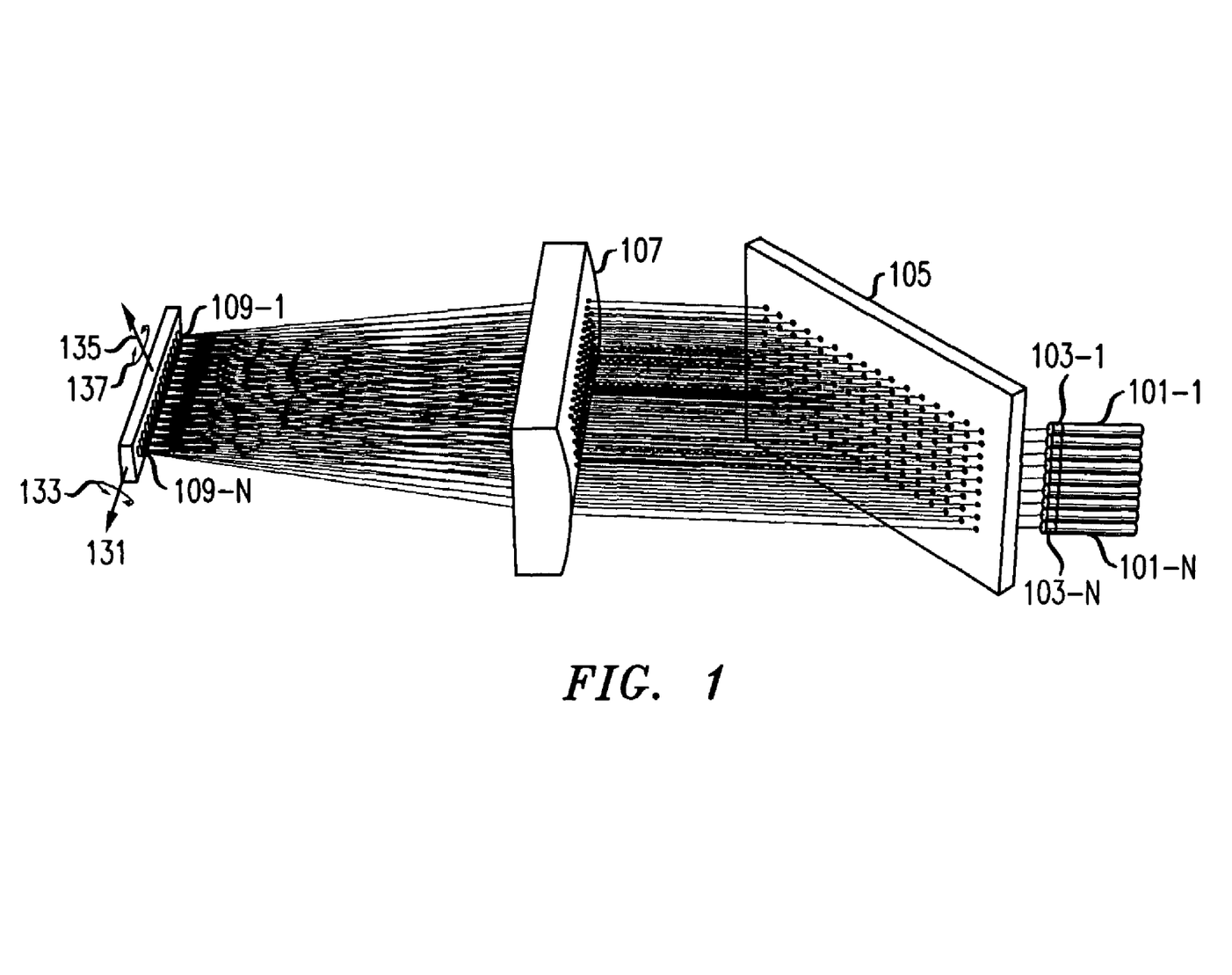
FIG. 1 shows a three-dimensional view of a 1×N wavelength selective switch that employs at least one wavelength sieve/combiner, each of which operates on discrete wavelength units and is optically interposed between an array of fibers and an array of micro mirrors, in accordance with the principles of the invention.

FIG. 1 shows a three-dimensional view of a 1×N wavelength selective switch that employs at least one wavelength sieve/combiner, each of which operates on discrete wavelength units and is optically interposed between an array of fibers and an array of micro mirrors, in accordance with the principles of the invention. Shown in FIG. 1 are a) optical fibers 101-1 through 101-N, collectively optical fibers 101; b) collimators 103-1 through 103-N, collectively 103, with one collimator for each respective optical fiber; c) integrated wavelength sieve/combiners 105-1 to 105-N, collectively integrated wavelength sieve/combiner 105; d) focusing lens 107; and e) micro mirrors 109-1 through 109-N, which collectively form micro mirror array 109. Although for FIG. 1 all possible rays are shown, in actual operation not all of the rays are necessarily employed. The particular rays employed will depend on the function to be performed by the arrangement, which fibers are input fibers and which are output fibers, and the position of the MEMS mirrors. Note that the dots shown in the FIGS. herein are for pedagogical purposes only, to convey the location at which a ray meets a surface of a device. However, such dots would not be found in an actual implementation, only the structure for implementing any function at such a surface will be found.

Optical fibers 101 supply optical signals to be routed through the 1×N wavelength selective switch. In a typical application, one optical fiber supplies a multiplexed optical signal and the remaining optical fibers receive various wavelengths from the multiplexed optical signal. Alternatively, in the reverse direction, all but one of the optical fibers supply optical signals of various different wavelengths which are then supplied as an output via the remaining optical fiber. Those of ordinary skill in the art will readily recognize the other combinations that may be achieved using various combinations of optical fibers 101 as inputs or outputs. In fact, fibers may be used simultaneously for both input and output, e.g., by using a circulator at the end of the fiber opposite to the end coupled to collimators 103, as is well know in the art.

The light supplied by each fiber of fiber bundle 101 passes through a respective corresponding one of collimators 103. The function of each collimator is to collimate the beam of light supplied from its respective associated input fiber. Each of collimators 103 is essentially a lens integrated with the end of its associated one of optical fibers 101. In alternative embodiments of the invention, in lieu of employing collimators 103, an array of separate micro lenses may be employed.

Each of wavelength sieve/combiners 105 can split a wavelength division multiplexed (WDM) beam into various discrete wavelength unit beams each of which contains prescribed wavelength channels, or it can cause multiple copies of part or all of the wavelengths to be supplied as outputs. Each of wavelength sieve/combiners 105 may also function in the opposite direction to combine such various beams into one wavelength division multiplexed beam. Typically, each of optical fibers 101 is associated with a respective one of wavelength sieve/combiners 105.

Figure 2:
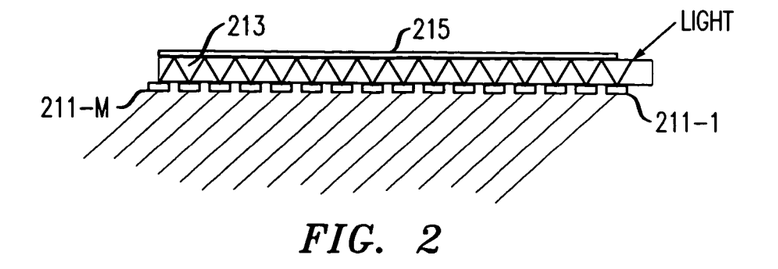
FIG. 2 shows a top view of an exemplary embodiment of one of wavelength sieve/combiners of FIG. 1.

As shown in FIG. 2, which is a top view of an exemplary embodiment of one of wavelength sieve/combiners 105, each of wavelength sieve/combiners 105 may be manufactured by placing at least one thin film filter 211 along at least one side of substrate 213. Substrate 213 may be, for example, a glass plate or any other material that passes the wavelengths to be processed by the 1×N wavelength selective switch without undue attenuation. Typically, as is shown in FIG. 2, more than one thin film filter 211 is employed, e.g., one for each wavelength channel to be split out of, or combined into, a WDM beam. The other side of substrate 213 may include one or more reflective portions 215 to guide light not passed by previously encountered thin film filters 211 onto the next one of thin film filter 211. In other embodiments of the invention the other side of the glass may also contain additional thin film filters to allow prescribed wavelength channels to exit from that side of the substrate 213. In such embodiments of the invention an additional focusing system and array of micro mirrors on the same side of optical filters 101 as the fibers may be employed to focus and reflect beams exiting from the second side of the substrate 213.

Figure 3:
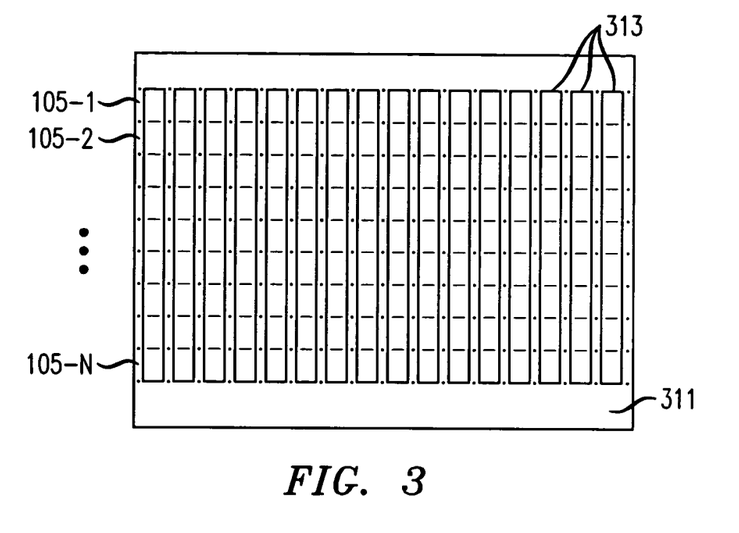
FIG. 3 shows a front view of an exemplary embodiment of wavelength sieve/combiners of FIG. 1 looking toward the wavelength sieve/combiners.

Wavelength sieve/combiners 105 may be arranged adjacent to one another, e.g., at the same spacing as fibers 101. Note that the dashed lines separating each of sieve/combiners 105 do not represent any required physical element but are shown to help visualize the stacked nature of wavelength sieve/combiners 105. Preferably, as shown in FIG. 3, which is a front view of an exemplary embodiment of wavelength sieve/combiners 105 looking toward wavelength sieve/combiners 105 (FIG. 1) from focusing system 107, wavelength sieve/combiners 105 are formed in an integrated fashion on a single substrate. For example, parallel strips of thin film filters 313 (FIG. 3) are placed on substrate 311 in the same direction as optical fibers 101 (FIG. 1) are adjacent to each other. Light enters filters 105 in FIG. 3 from behind the visible face.

Wavelength sieve/combiners 105 may also be implemented in free-space versions by suspending appropriately the necessary filter and reflective elements. Further note that, unlike FIG. 3 where each of the strips are substantially uniform, one or more of the spots that correspond to each thin film filter may actually be independent, thus permitting full variation in the thin film filters and the design of each of wavelength sieve/combiners 105.

Wavelength sieve/combiners 105 may be implemented in one embodiment of the invention by a thin film wedge, which is a passband filter that has a central wavelength that changes as a function of position across its surface. In another embodiment of the invention, the thin films may be deposited on the substrate, preferably in the form of a disk, while it is rotating at high speed so that circular layers of different films result. At least one layer is deposited so it varies across part of the substrate, e.g., it has varying thickness from the inside of the disk to the outside of the disk. Slices across the disk from the peripheral area toward the center may then be taken and used as wavelength sieve/combiners 105.

Figure 4:
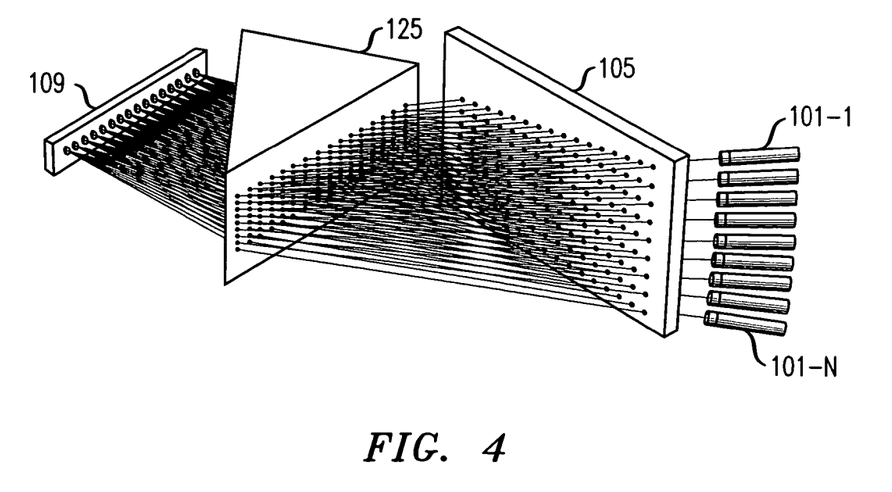
FIG. 4 shows an embodiment of the invention in which a prism is optically interposed between the wavelength sieve/combiners and the micro mirror array.

Preferably, the beams between wavelength sieve/combiner 105 and micro mirrors array 109 should be converging to the plane of micro mirror array 109. This may be achieved by employing focusing system 107 to focus the output beams from each of wavelength sieve/combiners 105 onto array of micro mirrors 109. Alternatively, the beams from optical fibers 101 may be made converging as they emerge from optical fibers 101. In such an embodiment of the invention, shown in FIG. 4, prism 125 may be optically interposed between wavelength sieve/combiners 105 and micro mirror array 109 to appropriately line-up the beams.

Primarily, micro mirrors 109 are arranged to tilt about first axis 131. Thus, the mirror primarily tilt in the direction shown as 133. It is also advantageous for purposes of hitless switching and to alleviate alignment requirements for the mirrors to be able to tilt around second axis 135, the other orthogonal axis, in the direction shown as 137. Tilting about second axis 135 is used for hitless switching by, when a one of micro mirrors 109 needs to be rotated around first axis 131, thereby essentially taking the mirror "offline", then tilting it around first axis 131 to the a desired new angle to accommodate a change in output requirements, and then tilting the micro mirror back "online" by rotating it back around second axis 135. Advantageously, while the micro mirror is tilted off line, its beam will not be accidentally directed to an incorrect output fiber, which may occur when changing the tilt of the mirror while it is online. Thus, errors, or "hits", are not introduced in the other output beams. Alignment requirements of the micro mirrors are alleviated because they may be tilted about second axis 135 once the system is operational to compensate for any slight misalignment of micro mirror array 109.

Advantageously, in contrast to the prior art system, due to the discrete nature of the wavelength units processed by wavelength sieve/combiner 105, the beam width on each of micro mirrors 109 is independent of the bandwidth of a data signal being carried by the beam reflecting off the micro mirror.

Figure 5:
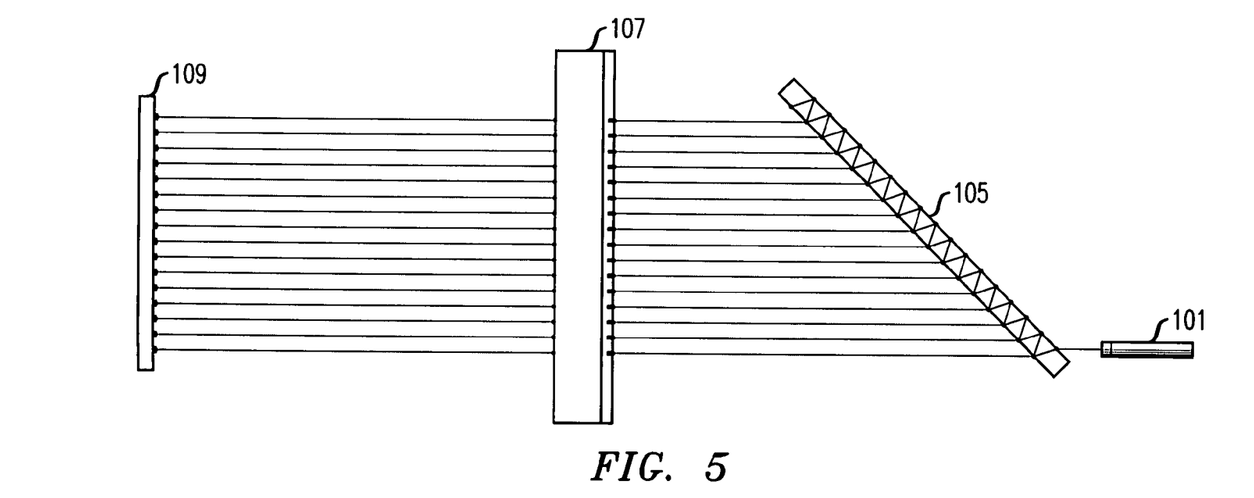
FIG. 5 shows a top view of the arrangement of FIG. 1.
Figure 6:
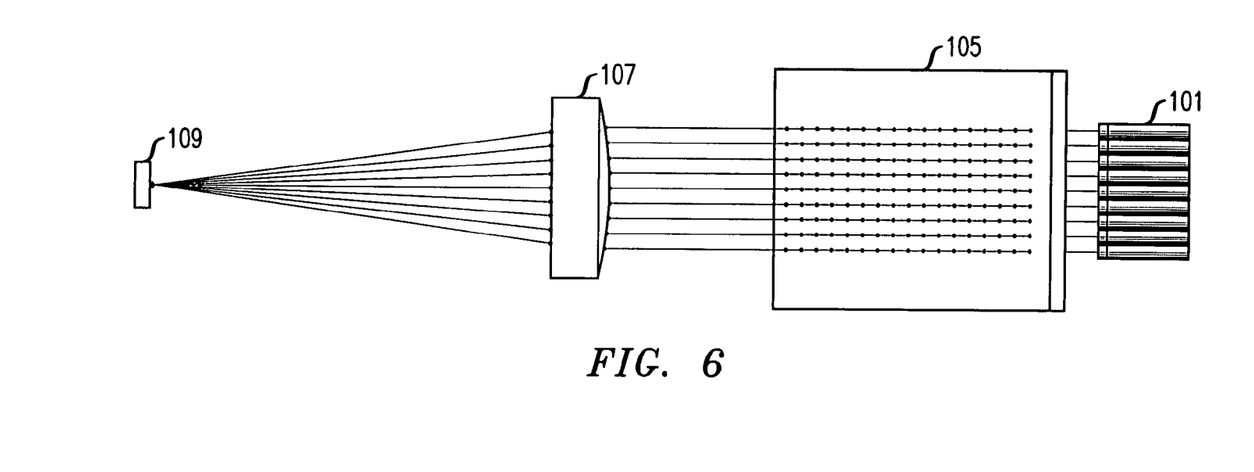
FIG. 6 shows a side view of the arrangement of FIG. 1.

FIG. 5 shows a top view of the arrangement of FIG. 1, while FIG. 6 shows a side view. Again, all possible rays are shown, although in operation not all of the rays need actually be employed.

Figure 7:
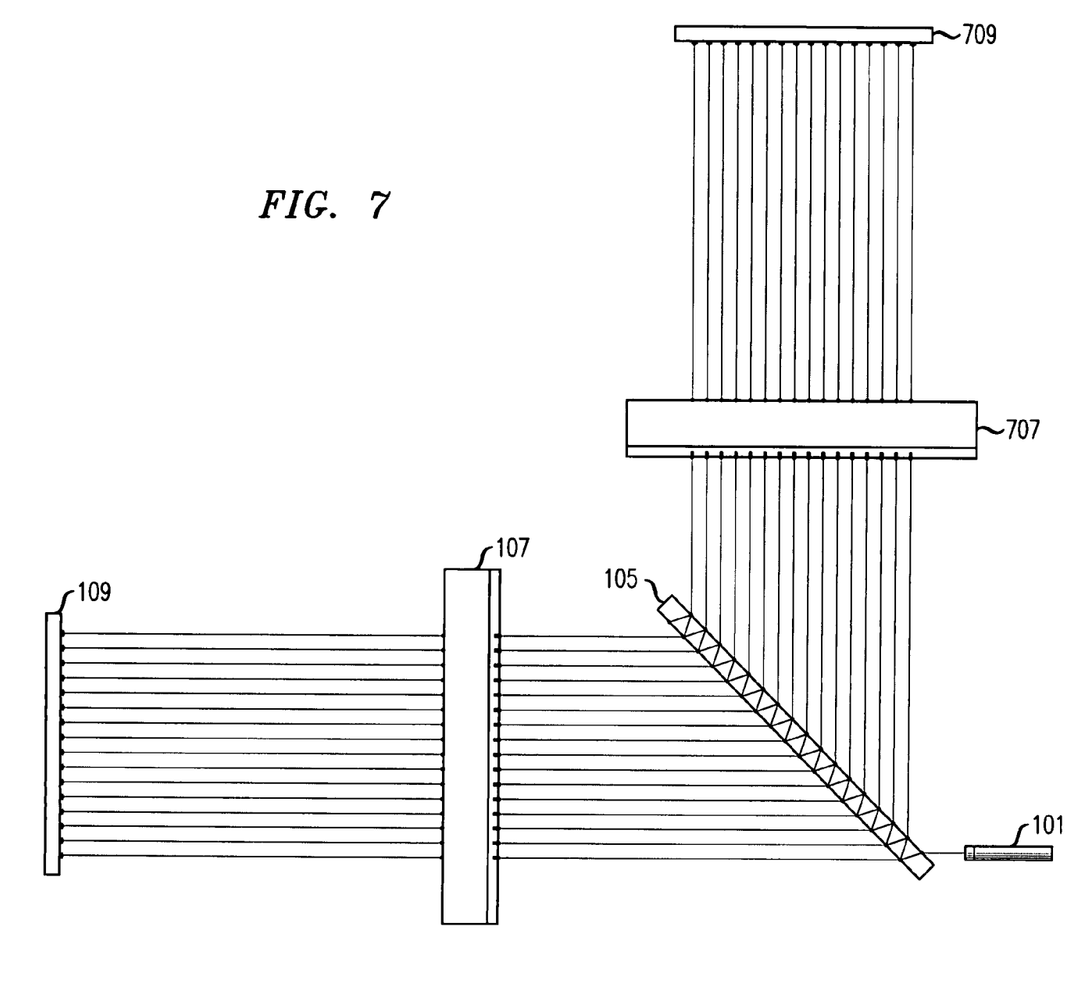
FIG. 7 shows a top view of an embodiment of the invention in which both sides of the glass of the sieve/combiners contain thin film filters, thereby allowing prescribed wavelength channels to exit from both sides thereof.

FIG. 7 is a top view of an embodiment of the invention in which both sides of the glass of sieve/combiners 105 contain thin film filters, thereby allowing prescribed wavelength channels to exit from both sides thereof. Such an embodiment of the invention requires additional focusing system 707 and additional array of micro mirrors 709 on the same side of optical filters 101 as are fibers 101 to focus and reflect beams exiting from the second side of sieve/combiners 105.

Figure 8:
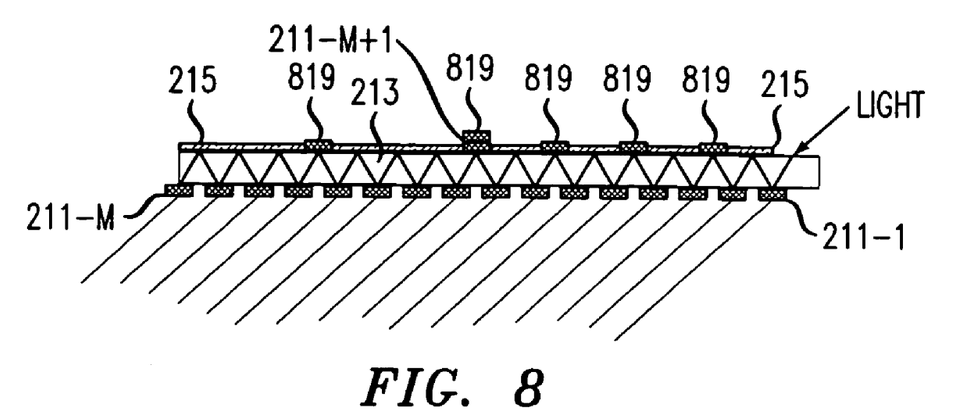
FIG. 8 is a top view of an exemplary embodiment of one of the wavelength sieve/combiners, where each of wavelength sieve/combiners is manufactured by placing at least one thin film filter along at least one side of a substrate and where the other side of the substrate 213 may include not only one or more reflective portions to guide light not passed by previously encountered thin film filters onto the next thin film filter, but also may include at least one detector for detecting one or more wavelengths of light that yet remain within the glass plate to that point.

FIG. 8 is a top view of an exemplary embodiment of one of wavelength sieve/combiners 105, where each of wavelength sieve/combiners 105 is manufactured by placing at least one thin film filter 211 along at least one side of substrate 213 and where the other side of substrate 213 may include not only one or more reflective portions 215 to guide light not passed by previously encountered thin film filters 211 onto the next one of thin film filter 211 but also at least one detector 819 for detecting one or more wavelengths of light that yet remain within the glass plate to that point. To this end, the other side of the glass may also contain additional thin film filters to allow only prescribed wavelength channels to exit from that side of the substrate 213 to reach the integrated detectors 819. Alternatively, if a detector 819 is such that it only responds to particular desired wavelengths, there is no need to employ an additional thin film filter for that detector. Note that, alternatively, reflective portions 215 may simply be thinned out to allow part of the light to pass through it to detectors 219 while reflecting the rest of the light as described hereinabove.

Advantageously, the reading from the detectors can be used in control mechanisms for the switch, such as to intentionally attenuate a wavelength of light by tilting its corresponding micro mirror to intentionally misalign its beam, or to maximize the passage of a wavelength of light, e.g., by tilting its corresponding micro mirror to best align its beam.

Operationally, the arrangement of FIG. 1 can be configured to operate as a multiplexor by having different wavelengths supplied as inputs by various ones of fibers 101. Each of the micro mirrors 109 corresponding to the input fibers is tilted so as to reflect the beam incident upon it to that one of wavelength sieve/combiners 105 that corresponds to the one of fibers 101 designated as the output fiber. Similarly, the arrangement of FIG. 1 can be configured to operate as a demultiplexor by having different wavelengths supplied as inputs in a single beam from a single one of fibers 101. Each of the micro mirrors 109 corresponding to an input wavelength is tilted so as to reflect the beam incident upon it to the one of wavelength sieve/combiners 105 that was designated to receive that wavelength as an output. Note that a fiber may receive more than one wavelength as an output. In this mode, the arrangement may be thought of as a programmable demultiplexer.

Note that instead of switching simple wavelengths, appropriate selection of the thin film filters allows groups of wavelengths to be switched together.

If the thin film filters employed are not wavelength selective, but instead simply pass only a portion of all of the wavelengths, e.g., 10%, multiple copies of the input signal can be created. Each copy may then be routed to an output fiber, thus providing a broadcast function using the arrangement of FIG. 1. Similarly, only some of the wavelengths may have only a portion passed, thereby creating copies of those wavelengths.

Note that wavelength switching, band switching, and broadcasting functions may be mixed and match to suit a desired application. For example, a cable TV application may be such an application, where most of the channels are broadcast to all users, but a few channels may only be broadcast to select users.

What is claimed is:

1. An apparatus, comprising:
an array of optical fibers;
at least one wavelength sieve/combiner that operates on discrete wavelength units; and
a first array of micro mirrors;
wherein said optical wavelength sieve/combiner is optically interposed between said array of optical fibers and said array of micro mirrors.

2. The invention as defined in claim 1 wherein any wavelength within one of said discrete wavelength units is supplied to or received from the same beam position by said wavelength sieve/combiner.

3. The invention as defined in claim 1 further comprising an array of micro lenses, one micro lens for each optical fiber in said array of optical fibers, said micro lenses being optically interposed between said array of optical fibers and said wavelenglh sieve/combiner.

4. The invention as defined in claim 1 further comprising an array of collimators, one collimator for each optical fiber in said array of optical fibers, each of said collimators being attached to one of said optical fibers, said collimators being optically interposed between said optical fibers and said wavelength sieve/combiner.

5. The invention as defined in claim 1 further comprising a first focusing system that focuses output beams from said wavelength sieve/combiner onto said first array of micro mirrors.

6. The invention as defined in claim 5 wherein said first focusing system comprises a lens.

7. The invention as defined in claim 5 wherein said first focusing system comprises a prism.

8. The invention as defined in claim 5 further comprising:
a second array of micro mirrors, wherein said optical wavelength sieve/combiner is also optically interposed between said array of optical fibers and said second array of micro minors; and
a second focusing system that focuses output beams from said wavelength sieve/combiner onto said second array of micro mirrors.

9. The invention as defined in claim 8 wherein said first focusing system and said second focusing system are different.

10. The invention as defined in claim 8 wherein said first focusing system and said second focusing system are the same.

11. The invention as defined in claim 1 wherein said wavelength sieve/combiner comprises at least one thin film optical filter.

12. The invention as defined in claim 11 wherein said at least one thin film optical filter is mounted on a substrate.

13. The invention as defined in claim 11 wherein said at least one thin film optical filter is mounted on a glass substrate.

14. The invention as defined in claim 11 wherein said at least one thin film optical filter is freespace suspended.

15. The invention as defined in claim 11 wherein said at least one thin film optical filter passes a portion of all of the wavelengths incident upon it and reflects a portion of all of the wavelengths incident upon it, whereby a copy of the incident wavelengths is created.

16. The invention as defined in claim 11 wherein said at least one thin film optical filter passes a pardon of some of the wavelengths incident upon it and reflects a portion of some of the wavelengths incident upon it, whereby a copy of the incident wavelengths that a portion is passed for is created.

17. The invention as defined in claim 1 wherein there is a plurality of said wavelength sieve combiners.

18. The invention as defined in claim 1 wherein there is a plurality of said wavelength sieve combiners and each of said wavelength sieve/combiners is formed from respective portions of a plurality of strips of thin film optical filters.

19. The invention as defined in claim 1 wherein each of said at least one wavelength sieve/combiners is adapted to supply as output one beam for a discrete wavelength unit for each of a plurality of strips of thin film optical filters incorporated therein.

20. The invention as defined in claim 1 further comprising at least one sensor for detecting light at at least a prescribed one of said discrete wavelength units.

21. The invention as defined in claim 20 wherein said at least one sensor is mounted on said at least one wavelength sieve/combiner.

22. The invention as defined in claim 1 wherein at least one micro mirror of said array of micro mirrors can tilt round two axes.

23. The invention as defined in claim 22 wherein each of said two axes are substantially orthogonal to the other.

24. The invention as defined in claim 1 further comprising a second array of micro mirrors;
wherein said optical wavelength sieve/combiner is also optically interposed between said array of optical fibers and said second array of micro mirrors.

25. The invention as defined in claim 24 further comprising a focusing system that focuses output beams from said wavelength sieve/combiner onto said second array of micro mirrors.

26. The invention as defined in claim 1 wherein said apparatus is adapted to operate at least in part in a broadcast mode.

27. The invention as defined in claim 1 wherein said apparatus is adapted to operate at least in part as a multiplexer.

28. The invention as defined in claim 1 wherein said apparatus is adapted to operate at least in part as a demultiplexer.

29. The invention as defined in claim 1 wherein said apparatus is adapted so that beams from said optical fibers are converging prior to encountering said at least one wavelength sieve/combiner.

30. The invention as defined in claim 29 further comprising a prism optically interposed between said wavelength sieve/combiner and said array of micro mirrors.

31. The invention as defined in claim 1 wherein light travels between said sieve combiner and first array of micro minors only via a free space path.

32. The invention as defined in claim 31 wherein said free space path includes al least one element from the group consisting of a mirror, a lens, and a prism.

33. An apparatus, comprising:
a wavelength sieve/combiner; and
an array of micro mirrors;
wherein said wavelength sieve/combiner is optically interposed between said array of micro mirrors and an array of optical elements at least one of which is adapted to supply an optical beam to said apparatus and at least one of which is adapted to receive an optical beam from said apparatus.

34. The invention as defined in claim 33 wherein light travels between said sieve/combiner and array of micro mirrors only via a free space path.

35. The invention as defined in claim 34 wherein said free space path includes at least one element from the group consisting of a mirror, a lens, and a prism.

* * * * *